(No Model.)
C. MILLS.
TRIPOD.
No. 471,392. Patented Mar. 22, 1892.
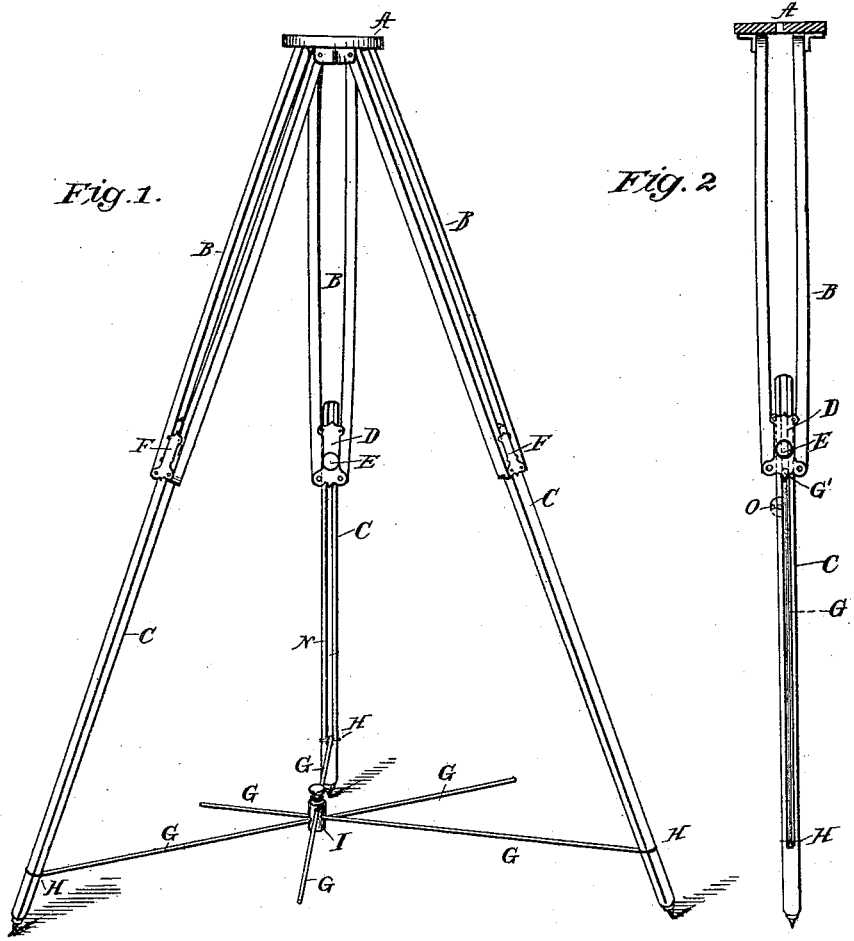
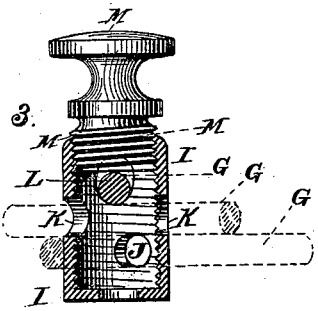
WITNESSES:
Edward C. Rowland
Thos. A. Nolan
INVENTOR
Charles Mills
BY Phillips Abbott
his ATTORNEY

UNITED STATES PATENT OFFICE.

CHARLES MILLS, OF NEW YORK, N. Y.

TRIPOD.

SPECIFICATION forming part of Letters Patent No. 471,392, dated March 22, 1892.

Application filed January 5, 1892. Serial No. 417,069. (No model.)

*To all whom it may concern:*

Be it known that I, CHARLES MILLS, a subject of the Queen of Great Britain, and a resident of New York city, in the county of New York and State of New York, have invented certain new and useful Improvements in Tripods, &c., of which the following is a specification.

My invention relates to an improvement in tripods for photographers' use. It is adapted, however, to use in many other structures, such as camp-stools, card-tables, and other devices in which it is desirable that the legs or supporting devices should be collapsible or foldable.

Generally stated, my invention consists in applying to the movable part of the legs of the tripod or like article movable braces therefor and supplying also a clamping device constructed and arranged in such manner that when the tripod has been once located these braces, being all of them adjustably clamped in the said clamping device, will be held rigidly in position. Thus movement on the part of the legs is prevented.

My invention is especially useful in case of photographers' tripods, because it frequently happens that when taking pictures passers-by will accidentally strike or kick or their clothing will become wrapped about and will pull away laterally one of the legs of the tripod. This frequently occasions an upsetting of the tripod, endangering the camera and all its contents; also, in gallery work this very frequently happens, and, furthermore, after the camera is located and the tripod leveled the operator sometimes finds that he is too near or too far away from his subject to secure the desired effect in his picture. Consequently the tripod has to be moved and the whole process of leveling done over again. By my invention both of these defects are overcome and certain other advantages secured in addition.

Figure 1 is an elevation of my invention. Fig. 2 is a detail of one of the legs. Fig. 3 is a detail of the clamping device.

I will describe my invention as applied to a photographer's tripod; but I wish it understood, as already substantially stated, that it is applicable also to other structures in which the legs or means of support are movable.

A is the platform of the tripod.

B B B are the legs.

C is an extension part of the legs, which are held to the legs proper by plates D and thumb-screws E on the inside of the legs and by plates F on the outside of the legs. It is not essential that the legs should be provided with the extendible portion C. Tripods are frequently made with solid or continuous legs. My invention is as applicable to one form as the other.

G G G are rods pivoted or fulcrumed at H to the legs at or near their lower end or base.

I is a clamp, the body portion whereof has holes drilled through it from side to side. The bottom hole J (see Fig. 3) is or may be substantially cylindrical to receive the lower rod G. The next hole K is somewhat elongated or made slot-like, so that the rod G, which passes through it, may be moved vertically somewhat. The remaining hole L is made more slot-like, so that the rod G, which enters it, may have more vertical movement. These holes are made in this form so that when the screw M is screwed down upon these rods to clamp them in their desired position they move vertically, so as to press against one another. Thus the single screw M holds them all firmly, and it will be seen that these rods may be moved through the clamp I in or out, so as to change the spread of the legs, and each individual leg, or rather its appropriate rod, has independent movement relative to the others. When it is desired to collapse the tripod or fold the legs together for transportation, the screw M is loosened, all of the rods are drawn through and away from the clamp, and they are then folded up into a groove N made in the side of the leg, so that the outer arc of the rod is flush with the face of the leg. The rod may then be held in position by a tipping-nut O, (see Fig. 2,) which is flush with the face of the leg. When in the case of extension-legs the upper end of the rod, as seen at G', Fig. 2, may pass under the plate D, the extension portion of the leg being depressed somewhat beyond its ordinary position to allow the rod to pass behind the plate D. In cases where the legs are solid or continuous, of course there will be no plate D, and the button O or an equivalent confining device will be used to hold the rods in their folded position.

It will be seen from the foregoing description that the tripod may be leveled and otherwise adjusted, as desired, with the same facility as those now in use. The rods passing freely through the clamp during this operation, and that when once properly placed and adjusted, a turn or two upon the threaded nut M clamps all the rods firmly in their then position, and when this is done the legs are rigidly held, so that the device as a whole may be moved about and will not ordinarily require any further adjustment, and also that when the tripod is used in the street or other exposed places passers-by cannot move a single leg, thus endangering the tripod and camera; and it will be also particularly noticed that by my invention the legs are supported at or near their lower end or base near where they join the place of ultimate support—i. e., the floor of the room, sidewalk, turf, or the like. I call attention to this fact particularly because I am aware that heretofore certain devices have been applied to the legs of tripods at or near the table of the tripod. Such devices have not been found satisfactory because supporting-legs so thin and flexible as tripod-legs ordinarily are at or near their upper end do not give the necessary stability and firmness to the legs. The photographer in moving a tripod the legs of which have been so supported or braced catches hold of the legs and necessarily exerts considerable pressure or strain upon them. This deflects them from their proper radiating lines, and when the tripod is placed upon the floor again the friction of the end of the legs, especially if they have spikes in them, as is usually the case, against the floor, holds them in their then bent or deflected position. This of course results in destroying the adjustment "level" of the camera.

I claim—

1. A tripod or other device having movable legs, bracing-rods movably connected to the legs at or near their lower ends, and an adjustable clamping device to adjustably clamp the rods, substantially as set forth.

2. A tripod or other device having movable legs, bracing-rods movably connected to the legs at or near their lower ends, means to hold the rods in a folded position against the legs, and an adjustable clamping device to adjustably clamp the rods, substantially as set forth.

3. A tripod or other device having movable and extendible legs, bracing-rods movably connected to the extension part of the legs at or near their lower ends, and an adjustable clamping device to adjustably clamp the rods, substantially as set forth.

Signed at New York, in the county of New York and State of New York, this 2d day of January, A. D. 1892.

CHARLES MILLS.

Witnesses:
PHILLIPS ABBOTT,
D. S. RITTERBAND.